United States Patent [19]
Sato

[11] Patent Number: 5,652,860
[45] Date of Patent: Jul. 29, 1997

[54] MEMORY CONTROL DEVICE

[75] Inventor: Fumiki Sato, Itami, Japan

[73] Assignee: Mitsubishi Denki Kabushiki Kaisha, Tokyo, Japan

[21] Appl. No.: 414,471

[22] Filed: Mar. 31, 1995

[30] Foreign Application Priority Data

Apr. 6, 1994 [JP] Japan .................................. 6-068424

[51] Int. Cl.⁶ ............................. G06F 12/00; G06F 12/10
[52] U.S. Cl. ........................... 395/481; 395/431; 395/416
[58] Field of Search .................................. 395/416, 481, 395/431, 432, 405

[56] References Cited

U.S. PATENT DOCUMENTS

| | | | |
|---|---|---|---|
| 4,803,621 | 2/1989 | Kelly | 395/405 |
| 4,823,324 | 4/1989 | Taylor | 365/230.03 |
| 4,839,856 | 6/1989 | Tanaka | 395/421.01 |
| 5,265,236 | 11/1993 | Mehring | 395/413 |
| 5,301,278 | 4/1994 | Bowater | 395/405 |
| 5,329,629 | 7/1994 | Horst | 395/405 |
| 5,479,640 | 12/1995 | Cartman | 395/438 |

OTHER PUBLICATIONS

The Design of the UNIX Operating System, Maurice Bach, ISBN 0-13-201799-7, 1986.

*Primary Examiner*—Tod R. Swann
*Assistant Examiner*—Christopher S. Chow
*Attorney, Agent, or Firm*—Lowe, Price, LeBlanc & Becker

[57] ABSTRACT

A memory control device which judges an access mode to a DRAM at a high speed by discriminating whether a row address of a DRAM to be currently accessed is the same as that of the DRAM at the last access in parallel with a translation from a logical page number to a physical page number.

11 Claims, 15 Drawing Sheets

MEMORY CONTROL DEVICE

BACKGROUND OF THE INVENTION

1. Field of the Invention

The present invention relates to a memory control device for controlling an access to a dynamic random access memory (hereinafter called a DRAM) in an information processing apparatus employing a virtual memory system.

2. Description of the Related Art

A virtual memory is a technique of seemingly enlarging capacity of a RAM. That is, where the virtual memory is used, capacity of a RAM that a programmer can use becomes larger than that of a physically existing RAM. In the virtual memory systems a virtual memory area is produced by dividing a program in segments or page units, and transferring the segments or page units between a main memory and a secondary memory. However, segments or page units of a program are not always allocated to continuous areas in actual allocation. Therefore, mapping of an address (logical address) used in the program on an address (physical address) where the program is actually allocated to the main memory is necessary. This mapping mechanism is realized by a memory management unit (MMU). The MMU generally uses a translation look-aside buffer (hereinafter called a TLB) to perform the mapping at a high speed.

A method of accessing a DRAM in a system using a DRAM as the main memory and translating further the physical address translated from the logical address by a TLB to a DRAM address will be explained. The basic access method to the DRAM is to select a row of data first by a row address, and then to select an object data among the row of data by a column address. The TLB is connected to the DRAM through a multiplexer which time shares the physical address from the TLB to generate the row address and column address of the DRAM.

As a method of accessing the DRAM at a high speed there is a method of access in a fast page mode. The fast page mode is the mode to access the DRAM only supplying a column address at the following access in sequentially access of the row data of the same column address. FIG. 1 is a block diagram showing a memory control device described in, for example, the Japanese Patent Application Laid-Open No. 4-38694 (1982). The memory control device is assumed to be connected to a DRAM with 1M-bit, to translate a 24-bit logical address to a 20-bit physical address, and further to translate the physical address to a DRAM address.

In FIG. 1, numeral 1 designates a TLB for translating a logical page number $A_N23-A_N16$ among a logical address $A_N23-A_N0$ to a physical page number $A'_N19-A'_N16$; numeral 2 designates a multiplexer for generating both a row address $A'_N19-A'_N16/A_N15-A_N10$ and a column address $A_N9-A_N0$ of the DRAM by time sharing on receipt of both the physical page number $A'_N19-A'_N16$ translated by the TLB and an address in a logical page $A_N15-A_N0$ (which becomes an address in a physical page without translation) among the logical address $A_N23-A_N0$; and numeral 3 designates a latch for latching the row address $A'_N19-A'_N16/A_N15-A_N10$ on receipt of the same time shared in the multiplexer 2, the latch 3 comprising a latch 3a for latching the high order 4 bits $A'_N19-A'_N16$ of a row address and a latch 3b for latching the low order 6 bits $A_N15-A_N10$ of a row address.

Numeral 4 designates a comparator for comparing a row address $A'_N19-A'_N16$ with a row address $A'_{N-1}19-A'_{N-1}16$ on receiving both the high order 4 bits of a row address $A'_N19-A'_N16$ among the row address outputted by the multiplexer 2 and the output of the latch 3a latching the row address $A'_{N-1}19-A'_{N-1}16$ at the last access to output a comparing result signal 5; numeral 6 designates a comparator for comparing a logical address $A_N15-A_N10$ with a row address $A_{N-1}15-A_{N-1}10$ on receiving both the logical address (row address) $A_N15-A_N10$ and the output of the latch 3b latching the logical address (row address) $A_{N-1}15-A_{N-1}10$ at the last access to output a comparing result signal 7; and numeral 8 designates a RAS (Row Address Strobe)/CAS (Column Address Strobe) generation circuit for generating a RAS signal to control a row address reading timing and a CAS signal to control a column address reading timing on receiving both the comparing result signal 5 from the comparator 4 and the comparing result signal 7 from the comparator 8. The multiplexer 2 together with the RAS/CAS generation circuit are taken as a DRAM access control unit.

FIG. 2 is a diagram showing a method of translating a logical address to a physical address and then the physical address to a DRAM address where, for example, a 1M-bit DRAM is used. The logical address is composed of a logical page number representing a page of a divided program and an address in a logical page. The logical page numbers are allocated to a secondary memory (such as a magnetic disk) and a main memory (DRAM), so that the logical page number is larger than the number of actual pages in the main memory. Generally, an address in a logical page is used as an address in a physical page without translation. The physical address thus obtained is divided into the row address and column address of the DRAM.

The operation of the memory control device having such construction as above will be explained hereinafter. First, high order 8 bits $A_N23-A_N18$ of a logical address among a 24-bit logical address $A_N23-A_N0$ are inputted into a TLB 1, which in turn translates the logical address $A_N23-A_N16$ to a 4-bit physical address $A'_N19-A'_N16$ to output. Low order 16 bits $A_N15-A_N0$ of a logical address among the logical address $A_N23-A_N0$ are unnecessary to be translated, so that they are used in that state as a physical address $A_N15-A_N0$. The multiplexer 2 receives a 20-bit physical address $A'_N19-A'_N16/A_N15-A_N0$ and outputs a 10-bit row address $A'_N19-A'_N16/A_N15-A_N10$ and a 10-bit column address $A_N9-A_N0$ in synchronism with a strobe signal generated by the RAS/CAS generation circuit 8.

The latch 3a latches the high order 4 bits $A'_N19-A'_N16$ of the row address outputted from the multiplexer 2, while the latch 3b latches the low order 6 bits $A_N15-A_N10$ of the row address outputted from the multiplexer 2. The comparator 4 receives both the row address $A'_{N-1}19-A'_{N-1}16$ at the last access outputted from the latch 3a and the row address $A'_N19-A'_N16$ outputted from the multiplexer 2, and compares the both. When these two addresses agree, the comparator 4 makes the comparing result signal 5 active, but when these two addresses disagree, the comparator 4 makes the comparing result signal 5 inactive. On the other hand, the comparator 6 receives both the row addresses $A_{N-1}15-A_{N-1}10$ at the last access outputted from the latch 3b and the logical addresses $A_N15-A_N10$, and compares whether these two addresses are identical with each other. When these two addresses are identical with each other, the comparator 6 makes the comparing result signal 7 active, while the comparator 8 makes the comparing result signal 7 inactive when these two addresses are not identical with each other.

The RAS/CAS generation circuit 8 receives the comparing result signal 5 and the comparing result signal 7 from the comparator 4 and the comparator 6, respectively, and if both the comparing result signal 5 and the comparing result signal 7 are active, generates a RAS/CAS signal for performing a DRAM access in a fast page mode. On the other hand, if at least either of the comparing result signal 5 and the comparing result signal 7 is inactive, the circuit 8 generates a RAS/CAS signal for performing a DRAM access in a normal mode of a basic access.

Since the conventional memory control device is configured as above, the device has a problem that whether the access in the fast page mode to the DRAM being able is not judged at a high speed when the comparison result signal 7 from the comparator 6 is active because the access mode to the DRAM is decided upon the comparison result signal 5 from the comparator 4, though the access mode to the DRAM is judged at a high speed when the comparison result signal 7 from the comparator 6 is inactive because the access mode to the DRAM is decided irrespective of the comparison result signal 5. That is, the address inputted into the comparator 4 must be a physical address, so that in order to obtain the physical address, a logical address must be translated by the TLB 1 to the physical address. In other words, this translating time prevents the judgment from being performed at a high speed.

SUMMARY OF THE INVENTION

The present invention is made to solve the problems as described above, and it is a principal object of the invention to provide a memory control device which is provided with means for judging whether a logical page number at the last access is translated to the same physical page number as that at the current access, when translating the logical page number to the physical page number, and which thus judges in parallel the access mode to the DRAM is in the fast page mode or in the normal mode with the translation from the logical address to the physical address.

The above and further objects and features of the invention will more fully be apparent from the following detailed description with accompanying drawings.

DESCRIPTION OF THE PREFERRED EMBODIMENTS

[Embodiment 1]

A first embodiment of the present invention will be explained hereinafter. In this embodiment, high order physical page number of a physical address is corresponding to a row address of a DRAM, while an address in a page of the low order physical address is corresponding to a column address of the DRAM.

Figure 1:
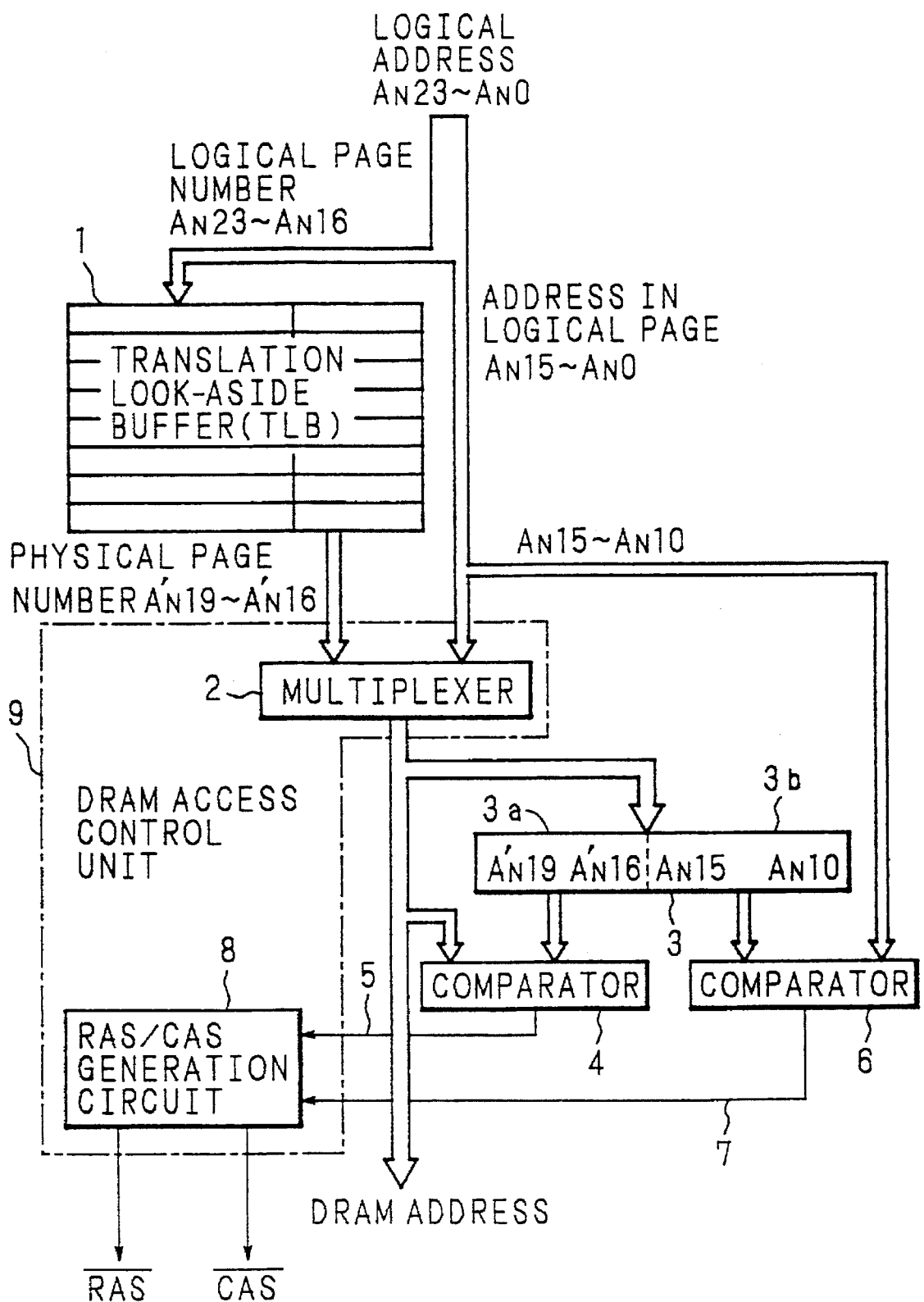
FIG. 1 is a diagram showing a conventional memory control device.
Figure 2:
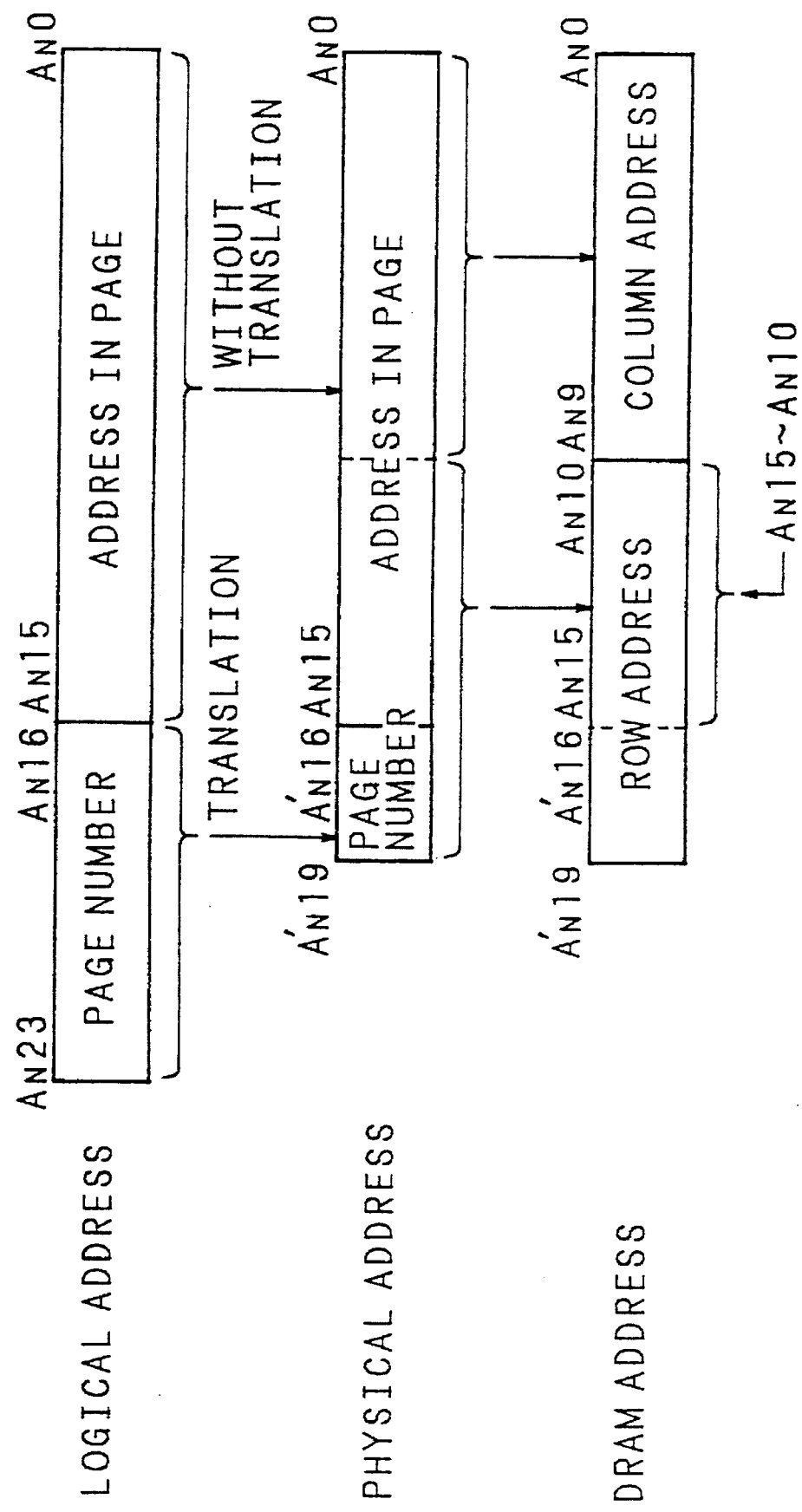
FIG. 2 is a diagram showing a conventional address translation method.
Figure 3:
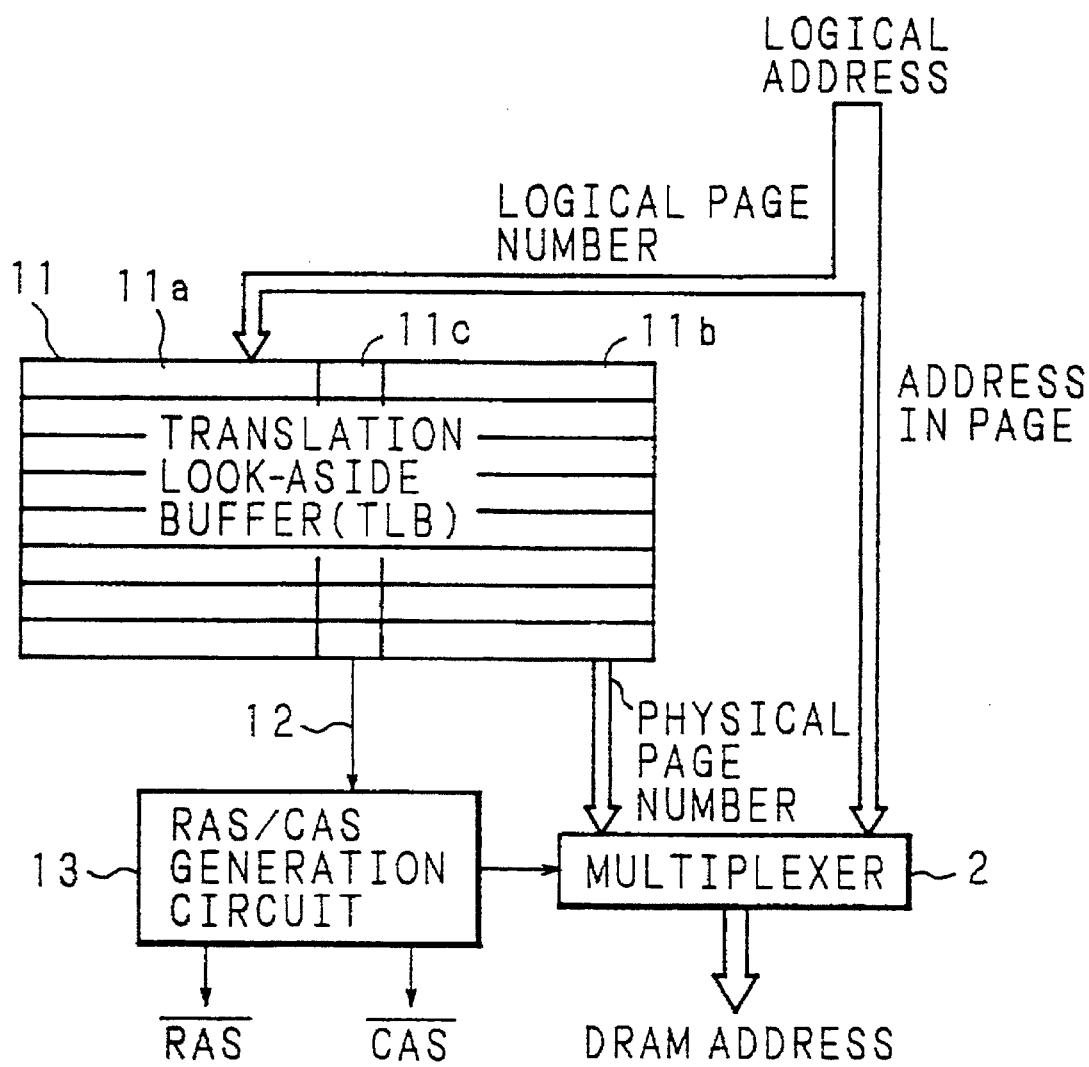
FIG. 3 is a block diagram of a first embodiment of a memory control device of the present invention.

FIG. 3 is a block diagram showing a memory control device of the present invention. In FIG. 3, numeral 11 designates a TLB; and numeral 2 designates a multiplexer for receiving both a physical page number translated in the TLB 11 and an address in a logical page (which will become an address in a physical page without translation) among a logical address and for generating both a row address and a column address of a DRAM on time sharing the physical address. The TLB 11 is composed of a register group $11a$ each holding a logical page number of a logical address, of a register group $11b$ each holding a physical page number corresponding to each of the register group $11a$, and of a flip-flop group $11c$ each corresponding to each of the register group $11a$. The flip-flop group $11c$ represents a register, storing a logical page number corresponding to a row address of the DRAM being active upon the fast page mode, in logic "1". In this embodiment, it is assumed that the register group $11a$ is composed of n registers $11a_1 11a_n$; the register group $11b$ is composed of n registers $11b_1-11b_n$; the flip-flop group $11c$ is composed of n flip-flops $11c_1-11c_n$; and respective registers $11b_1-11b_n$ and flip-flops $11c_1-11c_n$ correspond to respective registers $11a_1-11a_n$.

Numeral 12 designates a hit/miss signal for expressing a logic of a flip-flop $11c_i(1 \leq i \leq n)$ corresponding to a register $11a_i$ holding an inputted logical page number; and the logic of the flip-flop $11c_i$ being "1" indicates that the DRAM is possible to be accessed in the fast page mode (which case is called "hit"), while the logic of the flip-flop $11c_i$ being "0" indicates that the DRAM is necessary to be accessed in the normal mode (which case is called "miss"). On receiving the hit/miss signal 12, the RAS/CAS signal generation circuit 13 generates a RAS/CAS signal to access the DRAM (not shown) in the fast page mode when the hit/miss signal 12 indicates "hit", while the circuit 13 generates a RAS/CAS signal to access the DRAM (not shown) in the normal mode when the hit/miss signal 12 indicates "miss".

Figure 4:
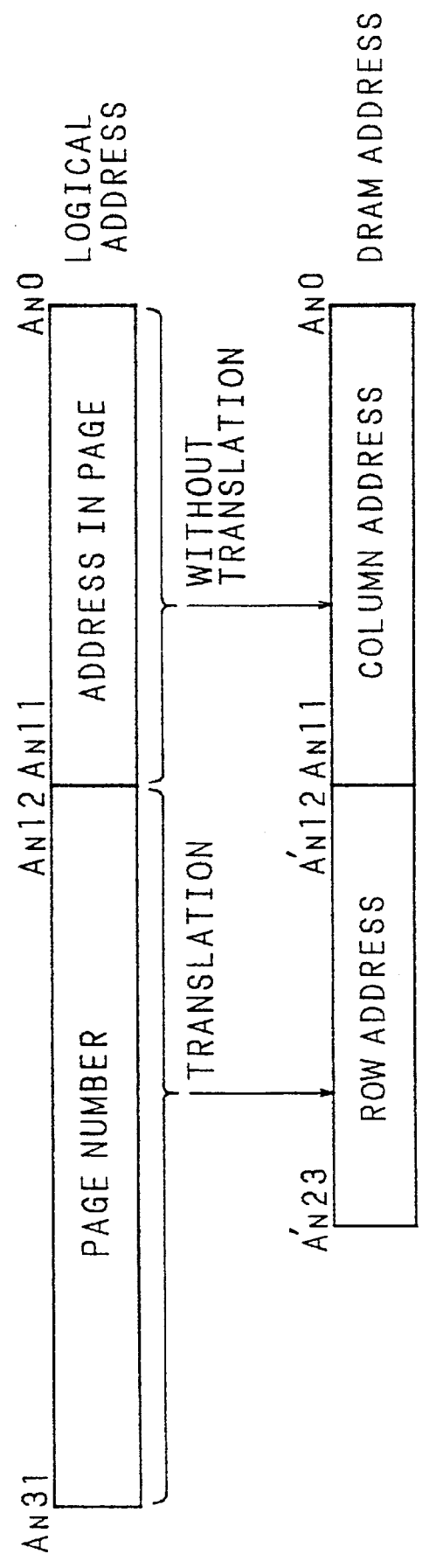
FIG. 4 is a diagram showing an address translation method according to the present invention.

FIG. 4 is a diagram for explaining an address translation method according to the present invention. A special feature of the address translation method according to the present invention is to coincide a physical page number requiring a translation from a logical address with a row address of a DRAM, and to coincide an address in a physical page not requiring a translation from a logical address with a column address of the DRAM. For example, as shown in FIG. 4, a case where an address is translated from a 32-bit length logical address to a 24-bit length physical address will be explained. The address space expressed by the 24-bit length is a size of 16M bytes, which is realized by placing eight 16M DRAM (16M word×1 bit) in parallel. Since the row address and column address of the 16M DRAM are 12 bits each, a high order 12-bit physical address among the 24-bit physical address becomes the row address of the DRAM and a low order 12-bit physical address becomes the physical page number, so that the high order 12-bit physical address becomes the physical page number and the low order 12-bit physical address becomes the address in the physical page. Thus, the logical address corresponding to the logical page number among the logical address is translated to the physical address which becomes the physical page number, and the logical address corresponding to the address in the logical page among the logical address becomes the address in the physical page without a translation, so that the high order 20 bits $A_N31-A_N12$ of the logical address among the 32-bit logical address $A_N31-A_N0$ become the logical page number, and the low order 12 bits $A_N11-A_N0$ become the address in the logical page.

Figure 5:
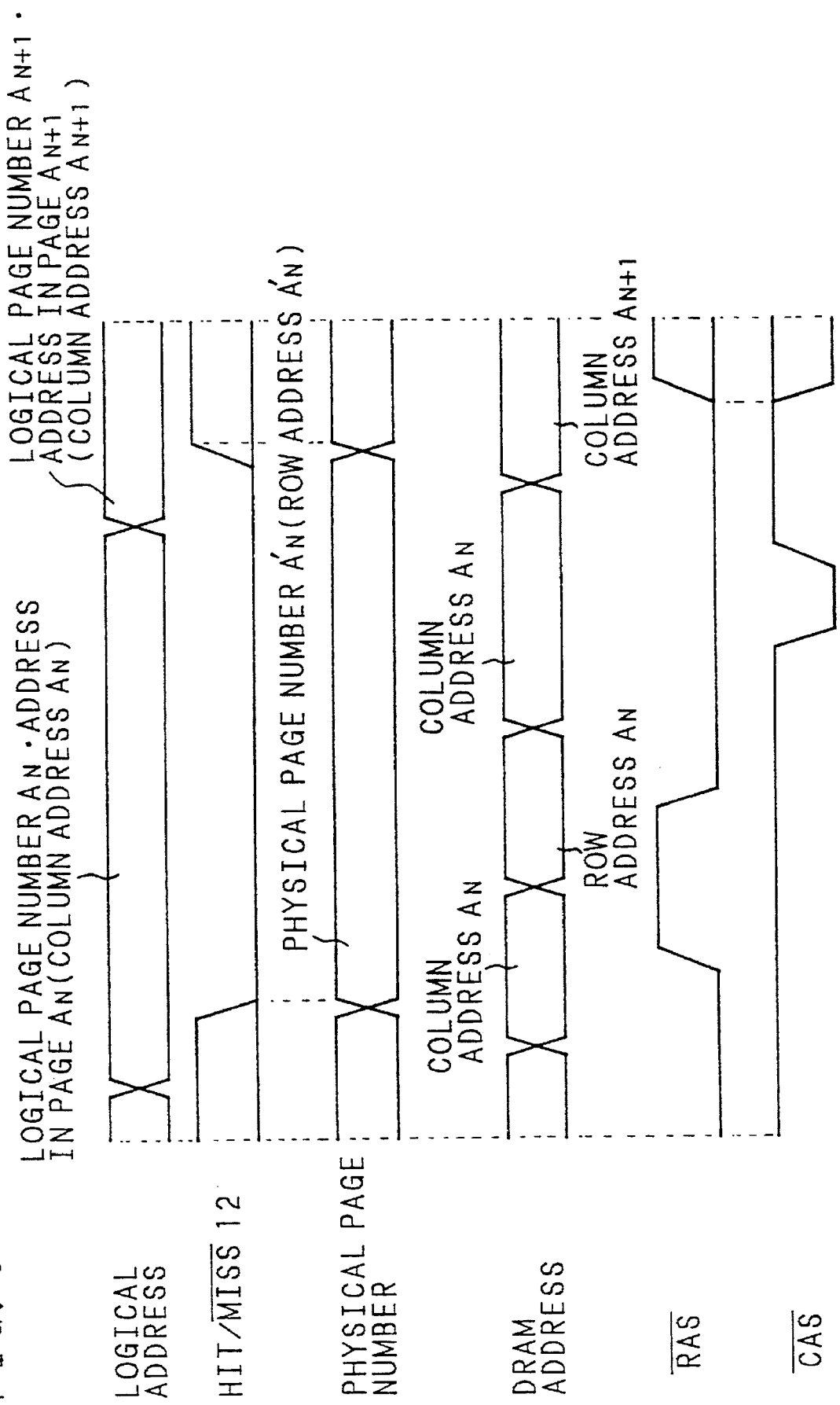
FIG. 5 is a timing chart of a memory control device according to the present invention.
Figure 6:
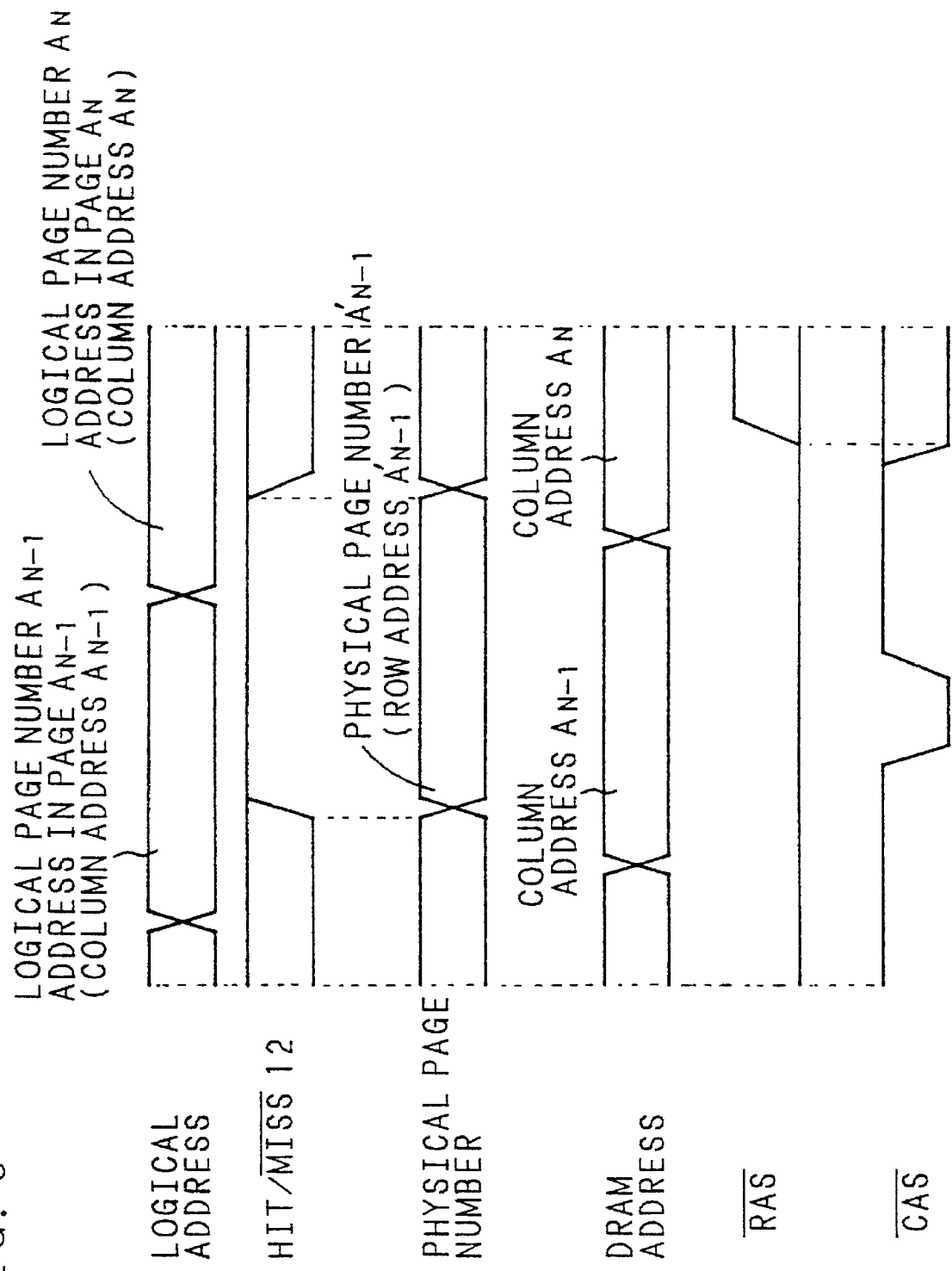
FIG. 6 is a timing chart of a memory control device according to the present invention.

The operation of the memory control device according to the present invention will be explained hereinafter using timing charts shown in FIGS. 5 and 6. FIG. 5 shows a timing chart when the DRAM access is performed in the normal mode; and FIG. 6 shows a timing chart when the DRAM access is performed in the fast page mode. First, the high order 20 bits $A_N31-A_N12$ of the logical page number for judging the access mode in the 32-bit logical address are inputted into the TLB 11. In the TLB 11, a register $11a_i$ ($1 \leq i \leq n$) storing data identical with the logical page number $A_N31$ $A_N12$ (DRAM row addresses) is selected from the register group 11a, and the physical page number $A'_N23-A'_N12$ held by a register $11b_i$ corresponding to the register $11a_i$ is outputted to the multiplexer 2, while data (hit/miss signal 12) of a flip-flop $11c_i$ corresponding to the register $11a_i$ is outputted to the RAS/CAS signal generation circuit 13. Thereafter, all of a flip-flop group 11c is cleared to be "0", and only the logic of the flip-flop $11c_i$ is set to be "1". That is, when the data of the flip-flop $11c_i$ outputted from the TLB 11 is the logic "0", it is indicated that logical page number $A_{N-1}31-A_{N-1}12$ at the last access was not translated to the physical page number $A'_{N-1}23-A'_{N-1}12$, so that the DRAM row access at the current access is not same as the DRAM row access at the last access. Also, when the data of the flip-flop $11c_i$ outputted from the TLB 11 is the logic "1", it is indicated that logical page number $A_{N-1}31$ $A_{N-1}12$ at the last access was translated to the physical page number $A'_N 23-A'_N12$, so that the DRAM row access at the current access is same as the DRAM row access at the last access. When there is no register $11a_i$ having data coincident with the logical page number $A_{N-1}$ $31-A_{N-1}12$ in the register group 11a, an exception occurrence is transmitted to a CPU of an information processor (not shown) which performs a software processing.

The RAS/CAS signal generation circuit 13 receives the hit/miss signal 12 outputted from the TLB 11, and when the hit/miss signal 12 indicates "0", that is, "miss", generates a RAS/CAS signal in the normal mode (FIG. 5), while the circuit 13 generates a RAS/CAS signal in the fast page mode when the hit/miss signal 12 indicates "1", that is, "hit" (FIG. 6).

In the memory control device of the present invention, a physical page number among a physical address is set to be coincident with a row address of a DRAM, and an address in a physical page among a physical address is set to be identical with a column address of the DRAM, so that in the row address of the DRAM, there are not present both types of bits necessary to be translated and unnecessary to be translated, unlike the prior art. That is, only bits necessary to be translated by the TLB 11 exist in the row address of the DRAM, so that whether the current row address coincides with a row address at the last access can be judged by providing the flip-flop group 11c among the TLB 11. The TLB 11 makes the flip-flop $11c_i$ corresponding to the register $11b_i$ which stores the physical page number (i.e. DRAM row address) translated from the inputted logical page number, output the holding data to the RAS/CAS generation circuit 13. Thus, the TLB 11 translates the inputted physical page number $A_N31-A_N12$ to the corresponding physical page number $A'_N23-A'_N12$ and simultaneously makes the corresponding flip-flop $11c_i$ output the holding data to set all of the flip-flop group 11c to be "0", and thereafter sets again the corresponding flip-flop $11c_i$ to be "1", so that whether the physical page number (i.e. DRAM row address) corresponding to the flip-flop $11c_i$ coincides with the physical page number (i.e. DRAM row address) at the last access can be judged at a high speed according to the outputted data from of the flip-flop $11c_i$. That is, using the address translation method and the memory control device according to the present invention allows a judgment whether DRAM access mode is a normal mode or a fast page mode at the same time as the address translation in the TLB 11, and neither latch for latching a row address nor a comparator for comparing a row address outputted from the latch with a row address for the next access data is required unlike the prior art, thereby allowing DRAM access mode to be judged at a high speed.

[Embodiment 2]

Figure 7:
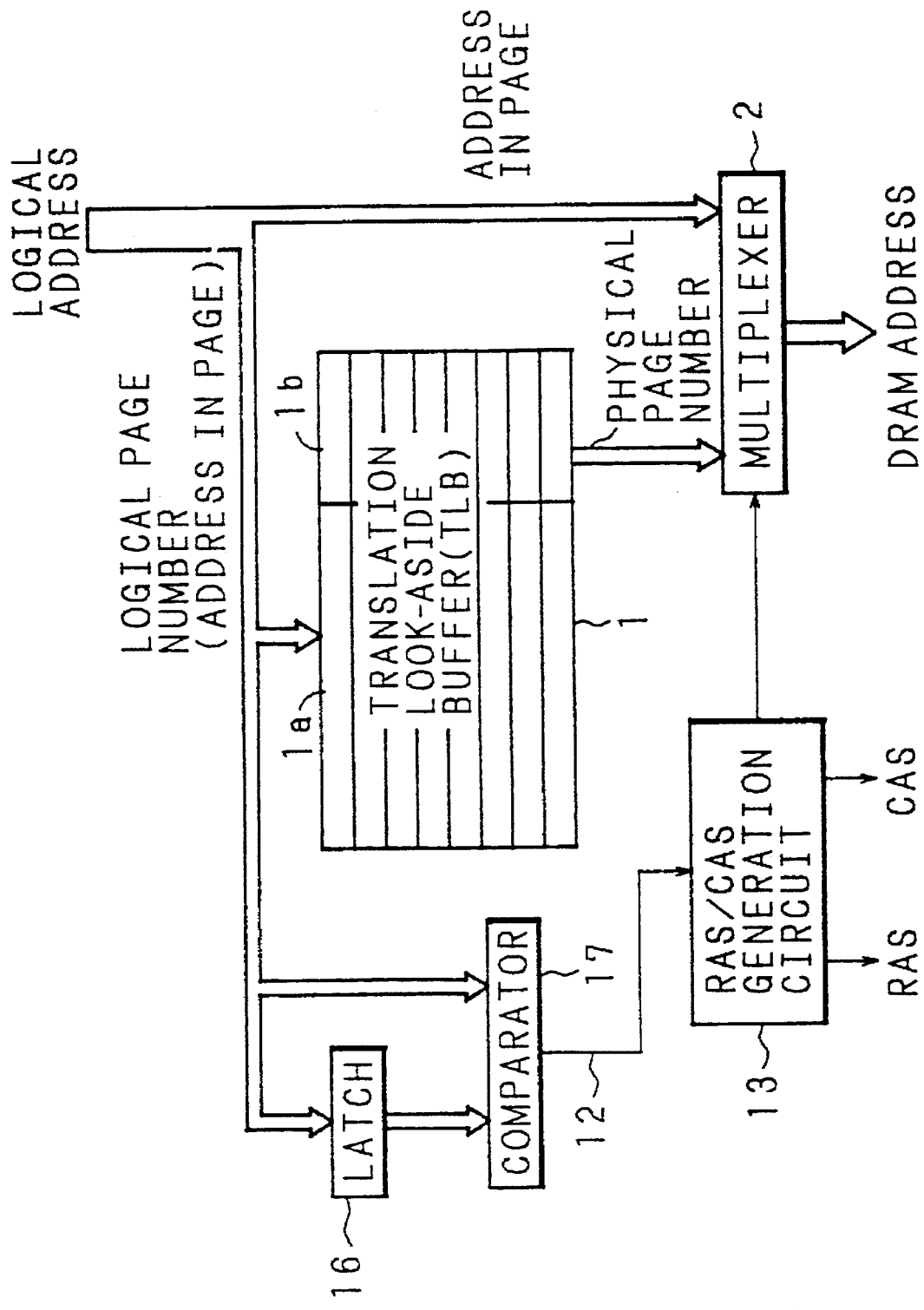
FIG. 7 is a block diagram of a second embodiment of a memory control device of the present invention.

FIG. 7 is a block diagram of a memory control device according to a second embodiment of the present invention. In the memory control device shown in FIG. 7, the address translation method as shown in FIG. 4 of the first embodiment, that is, the method of coinciding a physical page number in a physical address with a row address of a DRAM, and coinciding an address in a physical page with a column address of the DRAM, is employed. Therefore, also in this embodiment, a case where an address is translated from a 32-bit length logical address to a 24-bit length physical address will be explained. In FIG. 7, numerals 2, 12 and 13 designate the same parts as or the parts corresponding to those described in FIG. 3 indicating the first embodiment. In FIG. 7, numeral 1 designates a TLB which is composed of, in convenience, a register group 1a with n registers $1a_1-1a_n$ and a register group 1b with n registers $1b_1-1b_n$ where the respective registers $1b_1-1b_n$ correspond to the respective registers $1a_1-1a_n$. In FIG. 7, numeral 16 designates a latch to which a logical address equivalent to a logical page number among a logical address is inputted and which latches the logical page number; and numeral 17 designates a comparator into which both the logical page number outputted from the latch 16 and a logical page number for the next access data of the holding data in the latch 16 are inputted thereby to compare whether the logical page number at the last access coincides with the logical page number for the current access and to output the comparison result as the hit/miss signal 12 to the RAS/CAS signal generation circuit 13. When the logical page number at the last access coincides with the logical page number for the current access, the hit/miss signal 12 indicates "hit", while the hit/miss signal 12 indicates "miss" when the logical page number at the last access is not identical with the logical page number for the current access.

The operation of the memory control device configured as described above will be explained hereinafter. High order 20 bits $A_N31-A_N12$ in a 32-bit logical address $A_N31-A_N0$ are inputted into the TLB 1, the latch 16 and the comparator 17. In the TLB 1, a register $1a_i$ ($1 \leq i \leq n$) storing contents identical with the logical page number $A_N31$–$A_N12$ (i.e. DRAM row addresses) in the register group $1a$ is selected, and a physical page number $A'_N23$–$A'_N12$ held by a register $1b_i$ corresponding to the register $1a_i$ are outputted to the multiplexer 2.

At this point, the latch 16, when receiving the logical page number $A_N31$–$A_N12$, outputs the latching logical page number $A_{N-1}31$–$A_{N-1}12$ at the last access to the comparator 17, and holds the logical page number $A_N31$–$A_N12$ until the next logical page number $A_{N+1}31$–$A_{N+1}12$ is inputted. At the same time, the comparator 17 receives both the logical page number $A_{N-1}31$–$A_{N-1}12$ outputted from the latch 16 and the logical page number $A_N31$–$A_N12$, and compares whether the logical page number $A_{N-1}31$–$A_{N-1}12$ coincides with the logical page number $A_{N-1}31$–$A_{N-1}12$, thereby to output the comparing result as the hit/miss signal 12 to the RAS/CAS signal generation circuit 13.

The RAS/CAS signal generation circuit 13, on receiving the hit/miss signal 12 from the TLB 1, generates a RAS/CAS signal for the normal mode when the hit/miss signal 12 indicates "miss", while the circuit 13 generates a RAS/CAS signal for the fast page mode when the hit/miss signal 12 indicates "hit".

The memory control device in the present invention judges whether the the row address of the DRAM for the current access coincides with that at the last access by previously extracting part of a logical address to be translated to a row address of a DRAM, and comparing whether the logical address at the current access coincides with the logical address at the last access. Thus, whether the logical address at the current access coincides with that at the last access is judged by the latch 16 and comparator 17 while translating the logical page number to the physical page number by the TLB 1, so that it is unnecessary to judge whether the row address of the DRAM at the current access is equivalent to that at the last access after translating the logical address to the physical address by the TLB 1 thereby allowing the hit/miss judgment to be performed at a high speed.

Also, in this embodiment, an address in a logical page is outputted as a column address of a DRAM, and the hit/miss is judged faster than the operation in the TLB 1, which makes it possible to output a control signal for controlling the multiplexer 2 from the RAS/CAS signal generation circuit 13 faster than the embodiment 1, so that there is also an effect of allowing the access in the fast page mode to be performed faster.

[Embodiment 3]

Although in the embodiment 2, the physical page number identical with the row address of the DRAM, and the address in the physical page identical with the column address of the DRAM, a composition is possible in which the address in the logical page among the logical address is larger than the column address of the DRAM. The case will be explained here where the address in the physical page has a 16-bit length, and the column address of the DRAM has a 12-bit length.

Figure 8:
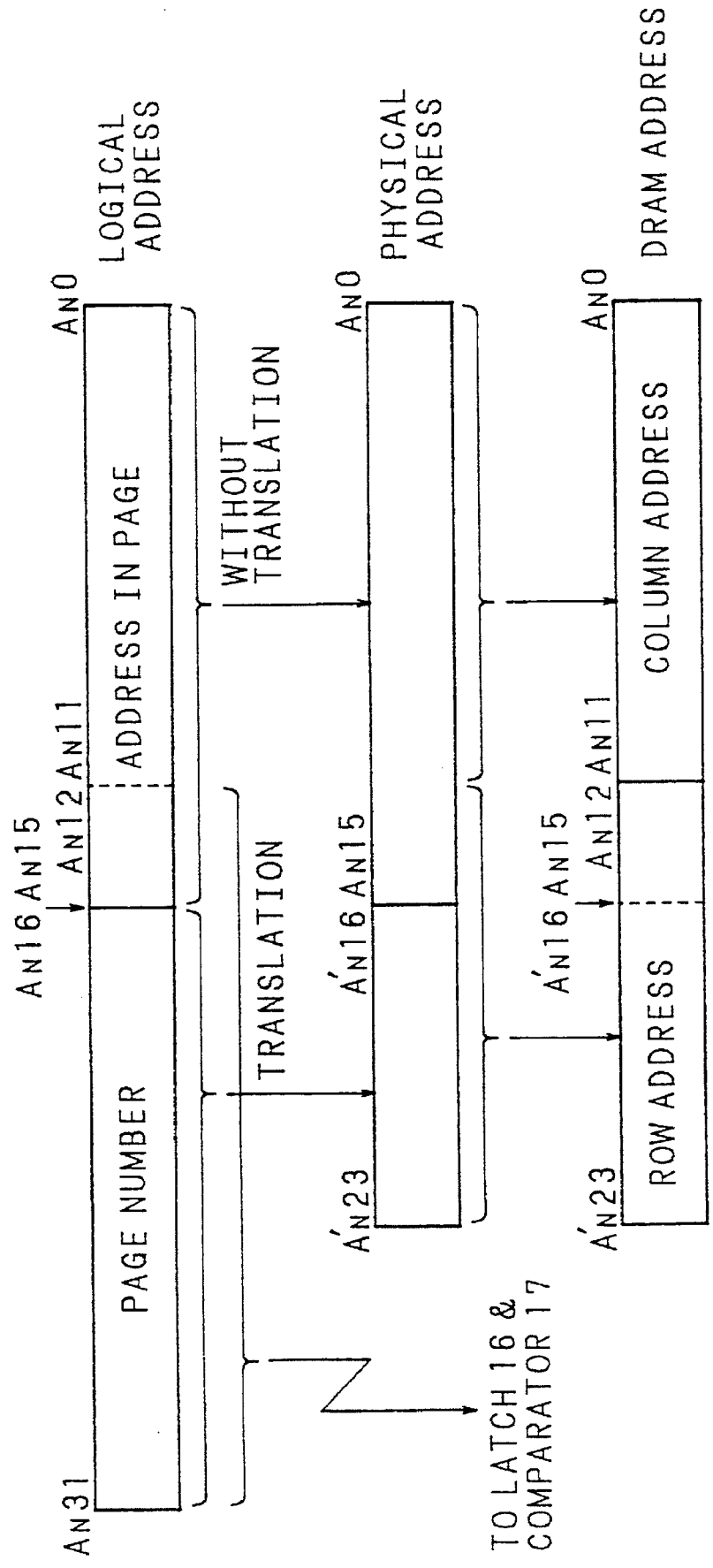
FIG. 8 is a diagram showing an address translation method in a third embodiment of the present invention.

FIG. 8 is a diagram for explaining an address translation method according to the present invention. For example, as shown in FIG. 8, a case will be explained where an address is translated from a 32-bit length logical address to a 24-bit length physical address. When the 32-bit length logical address is translated to the 24-bit length physical address, an address in a logical page among a logical address is used as an address in a physical page without translation, so that when fixing the address in the physical page to be 16-bit length, high order 16 bits $A_N31$–$A_N16$ of the logical address among the 32-bit logical address $A_N31$–$A_N0$ become the logical page number, while the low order 16 bits $A_N15$–$A_N0$ of the logical address become the address in the logical page. That is, logical page number $A_N31$–$A_N16$ are translated to become physical page numbers $A'_N23$–$A'_N16$. Also, the high order 12 bits $A'_N23$–$A'_N16/A_N15$–$A_N12$ of the physical address among the 24-bit physical address $A'_N23$–$A'_N16/A_N15$–$A_N0$ become the row address of the DRAM, while the low order 12 bits $A_N11$–$A_N0$ of the physical address become the column address of the DRAM. That is, in this embodiment, there is no restriction of coinciding the address in the physical page with the column addresses of the DRAM, thereby making it possible for the device to be connected also to a small-capacity DRAM with a column address smaller than an address in a physical page.

The operation of a memory control device employing the above-mentioned address translation method will be explained hereinafter. Also in this embodiment, the address translation is performed by the memory control device shown in FIG. 7 of the embodiment 2. The high order 16-bit logical page number $A_N31$–$A_N16$ among the 32-bit logical address $A_N31$–$A_N0$ are inputted to the TLB 1, while the high order 20-bit logical page number $A_N31$–$A_N12$ are inputted to the latch 16 and the comparator 17. In the TLB 1, a register $1a_i(1 \leq i \leq n)$ having data identical with the logical page number $A_N31$–$A_N16$ among the register group $1a$ is selected, and physical page number $A'_N23$–$A'_N16$ held by a register $1b_i$ corresponding to the register $1a_i$ is outputted to the multiplexer 2.

At this point, the latch 16, when receiving the logical page number $A_N31$–$A_N12$, outputs the latching logical page number $A_{N-1}31$–$A_{N-1}12$ at the last access to the comparator 17, and holds the logical page number $A_N31$–$A_N12$ until the next logical page number $A_{N+1}31$–$A_{N+1}12$ is inputted. At the same time, the comparator 17 receives both the logical page number $A_{N-1}31$–$A_{N-1}12$ outputted from the latch 16 and the logical page number $A_N31$–$A_N12$, and compares whether the logical page number $A_{N-1}31$–$A_{N-1}12$ coincides with the logical page number $A_{N-1}31$–$A_{N-1}12$, thereby to output the comparing result as the hit/miss signal 12 to the RAS/CAS signal generation circuit 13.

The RAS/CAS signal generation circuit 13, on receiving the hit/miss signal 12 from the TLB 1, generates a RAS/CAS signal for the normal mode when the hit/miss signal 12 indicates "miss", while the circuit 13 generates a RAS/CAS signal for the fast page mode when the hit/miss signal 12 indicates "hit".

The memory control device of this embodiment is also effective as the device described in the embodiment 2. By employing the address translation method in this embodiment, the row address of the DRAM may be smaller than the address in the logical page, thereby making it possible for the device to be connected also to a small-capacity DRAM.

[Embodiment 4]

In this embodiment, a memory control device will be described which provides the same logical address space to all processes, respectively, and even if a plurality of processes access the same logical address, no confusion will occur. In an information processor using the memory control device of this embodiment, a plurality of processes have different process numbers in order to identify the each. The process number together with the logical address are fed to the memory control device when fetching an instruction or accessing data. Therefore, when one process has an access right to a DRAM, an access to the same logical address by another process is inhibited.

Also in such an information processor, there is generally a special process called an operating system. The operating system is a privileged process over other processes, and has the right to access to the data of any other process. Thus, in an information processor employing the memory control device of this embodiment, it is assumed that a process having a specific process number (i.e. operating system) number feeds a process number different from its own, together with a logical address, to the memory control device in order to access data of another process. Therefore, when the operating system accesses a DRAM, the process number of the operating system is saved in a status register indicating a status of the information processor, and a process number different from its own, together with a logical address, are fed to the memory control device. It is advantageous, with respect to management, that only a process with a specific process number is privileged to execute such an instruction to access data of another process.

Figure 9:
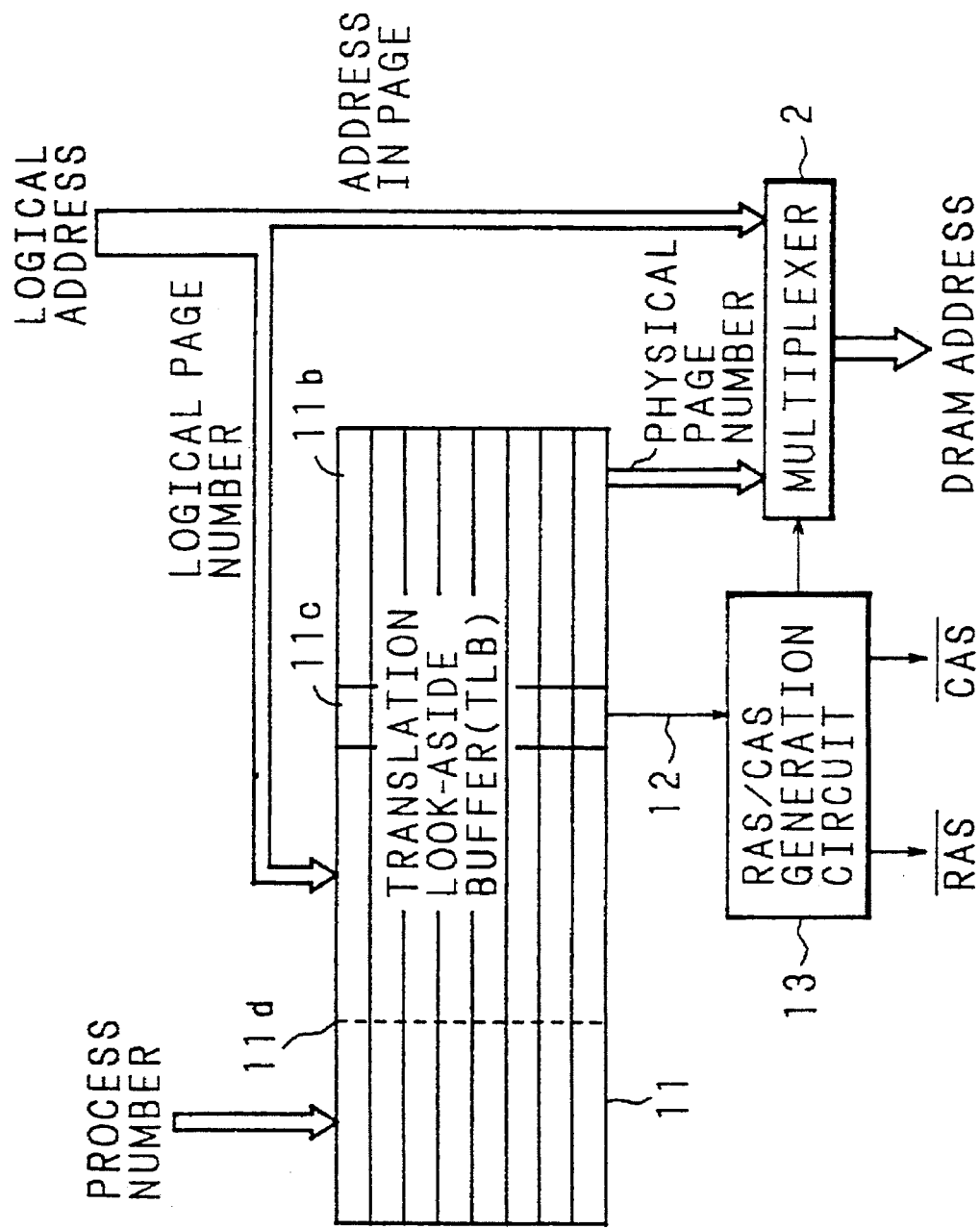
FIG. 9 is a block diagram of a fourth embodiment of a memory control device of the present invention.

In this embodiment, the above-mentioned process number together with the logical number are newly used as an extended logical page number. FIG. 9 is a block diagram of a memory control device according to this embodiment. In FIG. 9, reference codes 11b, 11c, 2, 12 and 13 designate the same parts as or the parts corresponding to those shown in the embodiment 1, except that in a TLB 11 in this embodiment, a register group 11d holding a logical page number extended by bits of the process number is employed instead of the register group 11a in the embodiment 1. The register group 11d has the same function as that of the register group 11a, but moreover be able to identify the process number on identifying the logical page number.

The operation of the memory control device configured as described above will be explained hereinafter. First, a logical page number with a process number among a logical address are inputted into the TLB 11, and at the extended logical page number including the process number, the same operation as in the embodiment 1 with the memory control device is performed. Therefore, when another process different from the last access is to access the same logical page number as that at the last access, the identical logical page number together with the process number is not present in the TLB 11, so that an exception occurrence is transmitted to a CPU to perform an exception process.

In this embodiment, the process number together with the logical number are used as an extended logical page number, so that in addition to the effects in the embodiments 1–3, there are effects that the equivalent logical space can be provided to all processes, and that the instruction or data of a logical address of one process can be protected from the access of the same logical address by another process.

[Embodiment 5]

Figure 10:
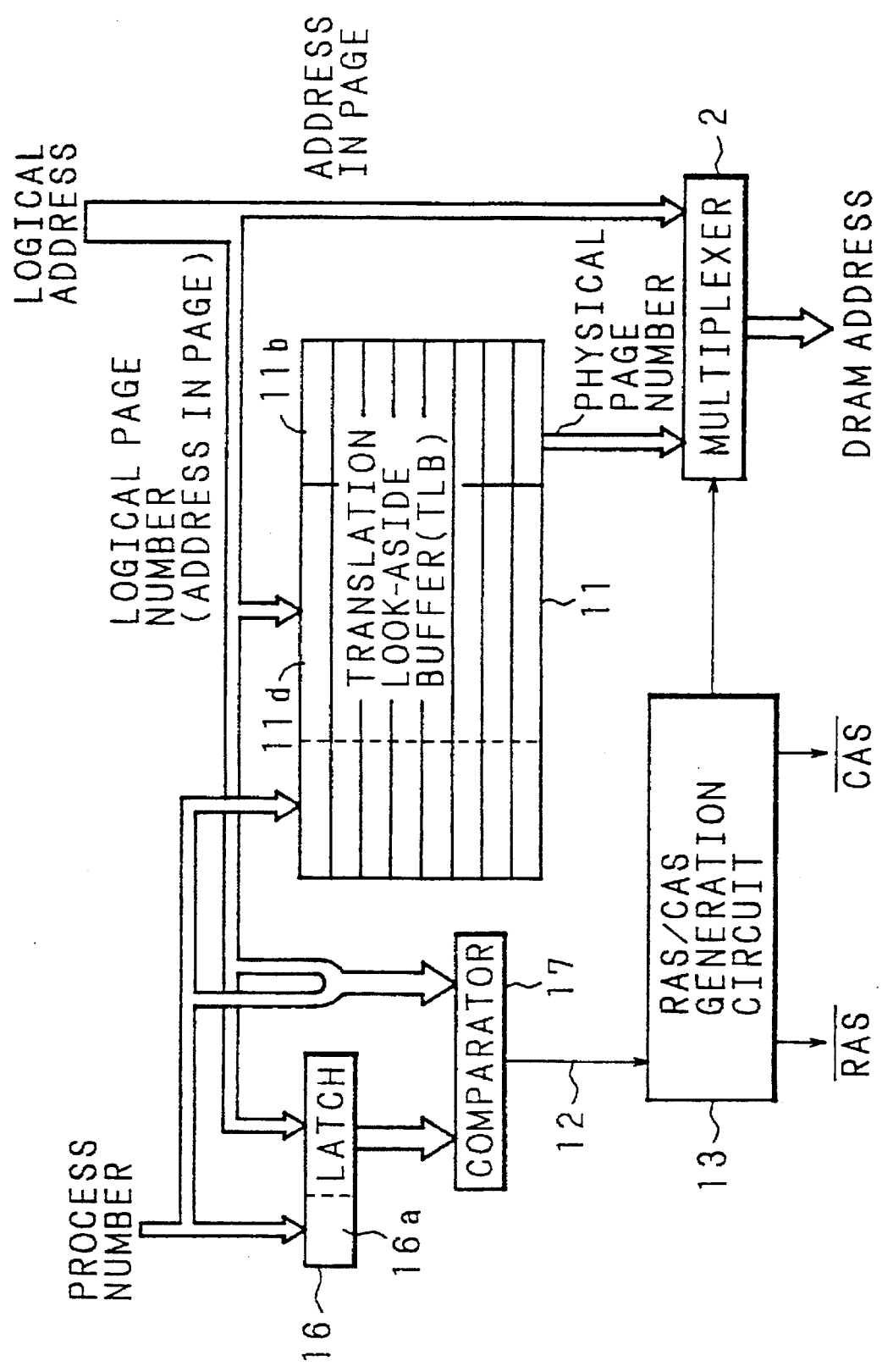
FIG. 10 is a block diagram of a fifth embodiment of a memory control device of the present invention.

The logical page number extended together with the process number and the logical page number may be used in the memory control device of the embodiment 2. FIG. 10 is a block diagram of a memory control device of the present invention using the above extended logical page number. In FIG. 10, reference codes 2, 11b, 12, 13, 16 and 17 designate the same parts as or the parts corresponding to those shown in FIG. 7 of the embodiment 2, except that in a TLB 11 in this embodiment, a register group 11d holding a logical page number extended by bits of the process number is present instead of the register group 11a in the embodiment 2. Also, in the latch 16, bits to latch the process number are extended.

The operation of the memory control device configured as described above will be explained hereinafter. First, a logical page number with a process number among a logical address are inputted into the TLB 11, and at the extended logical page number including the process number, the same operation as in the embodiment 2 with the memory control device is performed.

In this embodiment, the process number together with the logical number are used as an extended logical page number, so that in addition to the effects in the embodiments 1–3, there are effects that the equivalent logical space can be provided to all processes, and that the instruction or data of a logical address of one process can be protected from the access of the same logical address by another process. Also, it will be appreciated that in the memory control device of this embodiment, the address translation method as in the embodiment 3 may be employed, that is, an address translation method where an address in a logical page is larger than a column address of a DRAM.

[Embodiment 6]

As another embodiment of the present invention, there will be explained a memory control device provided with a logical address space having a first area where a logical address is translated to a physical address and allocated to a DRAM, and a second area where a logical address is a physical address unnecessary to be translated and allocated to an element such as a ROM, an I/O, or the like.

Figure 11:
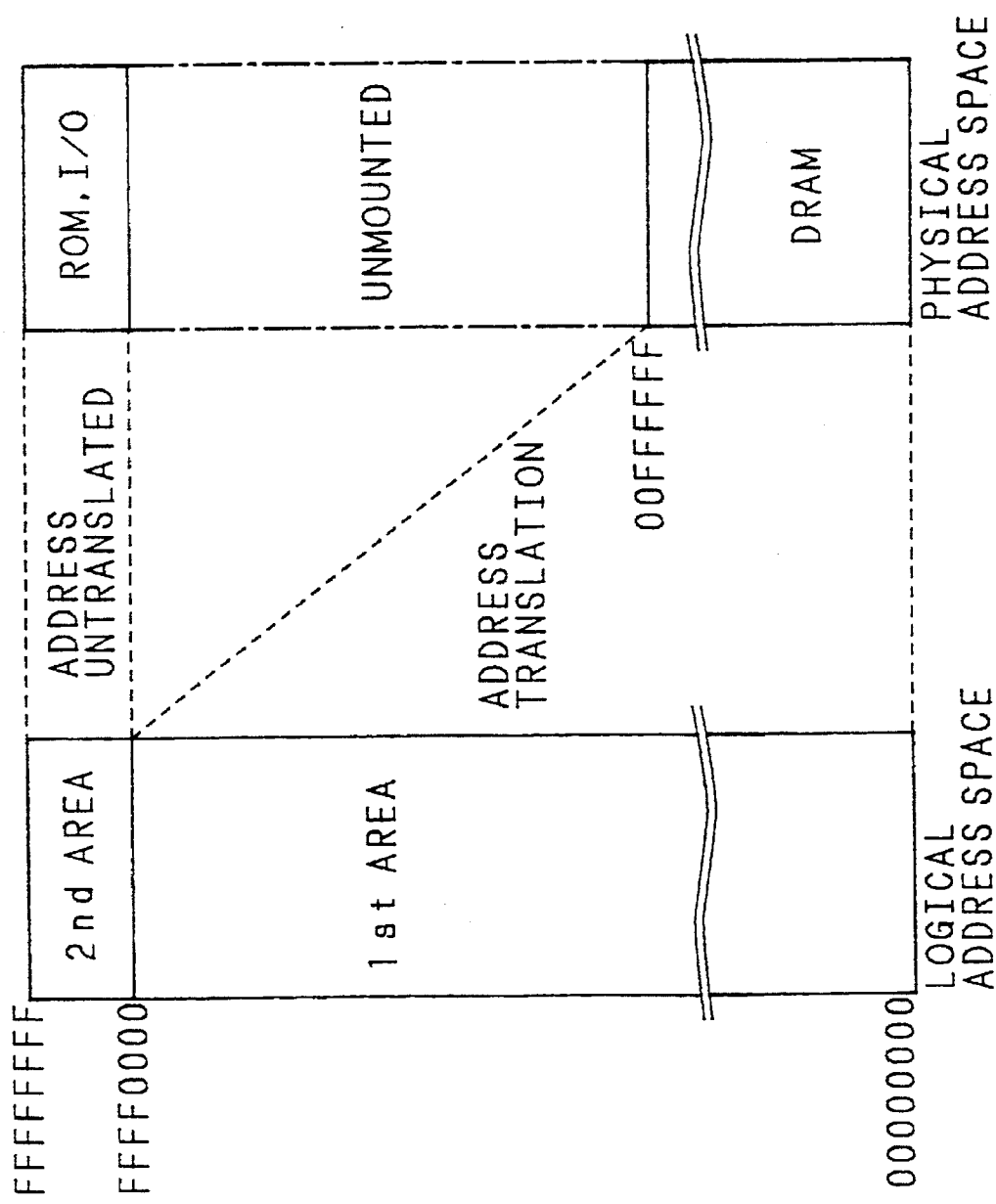
FIG. 11 is a diagram showing formation of an address space in a sixth embodiment of the present invention.

FIG. 11 is a diagram showing a method of translating an address from the logical address space including the above-mentioned first and second areas to a physical address space. In FIG. 11, addresses 00000000h through FFFEFFFFh expressed in hexadecimal of a 32-bit logical address space are the first area translated to a DRAM address; and addresses FFFF0000h through FFFFFFFFh expressed in hexadecimal are the second area corresponding to other elements addresses. An access to the first area is equal to an access to the physical area of 00000000h through 00FFFFFFh by an address translation, in which a DRAM is actually mounted. An access to the second area without an address translation is equal to an access to the same address in the physical address space.

Figure 12:
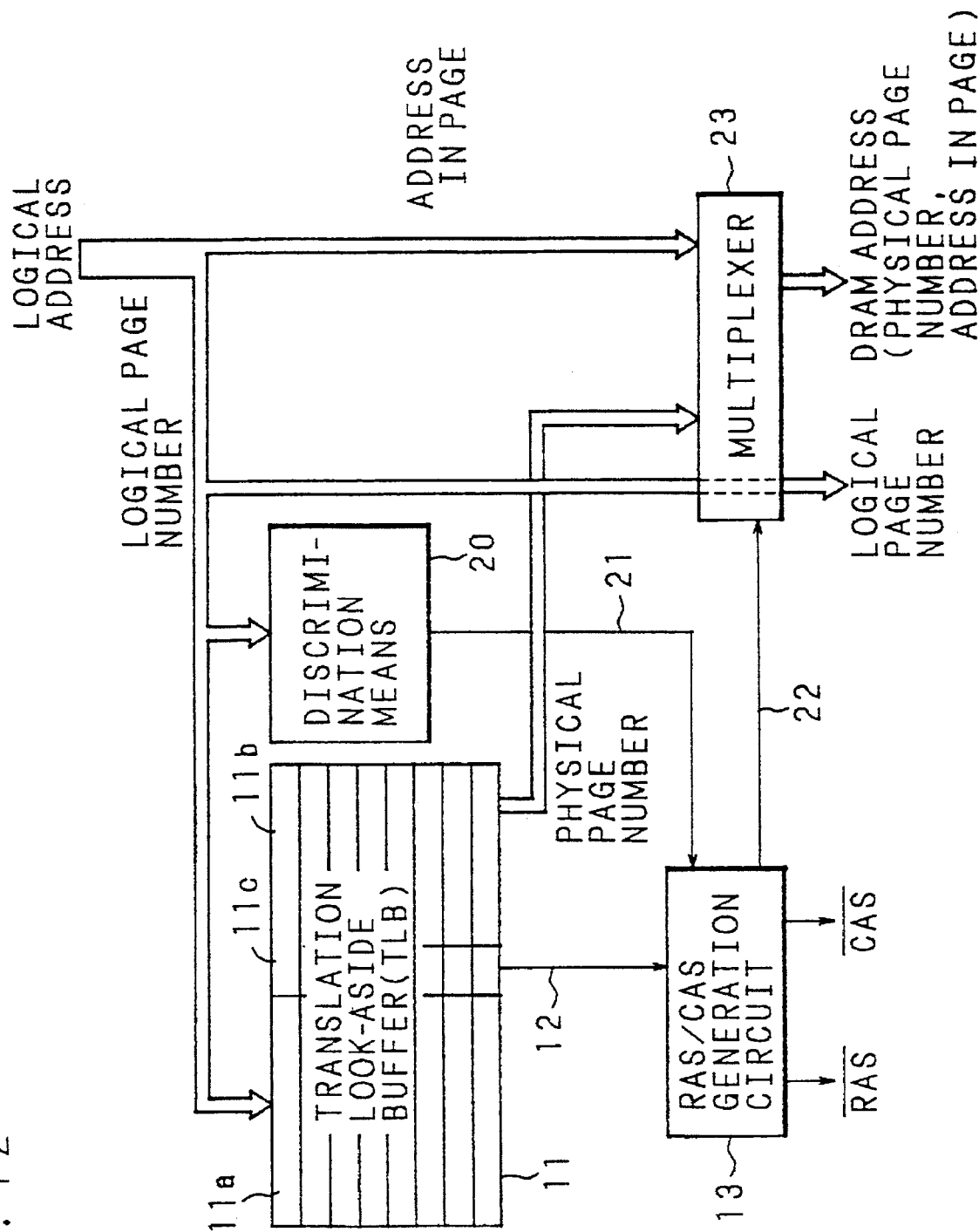
FIG. 12 is a block diagram of a sixth embodiment of a memory control device of the present invention.

FIG. 12 is a block diagram of a memory control device to perform the address translation method of the present invention. In FIG. 12, numerals 11 through 13 designate the same parts as or the parts corresponding to those shown in FIG. 8. Numeral 20 designates discrimination means for discriminating whether an access is to the first area or to the second area on receiving a high order 18-bit logical page number among a logical address. In this embodiment, whether an access is to the first area or the second area can be discriminated by the high order 18 bits of the logical address owing to the address allocation method. That is, when results obtained by comparing the high order 16 bits with "FFFFh" are all "1" (agree), the access is to the second area, while the access is to the first area when the comparison result of even one bit in the high order 16 bits is "0" (disagree). When the access is to the second area, the discrimination means 20 outputs an inhibition signal 21 to a RAS/CAS signal generation circuit 13 so as to inhibit to change the logic of a RAS signal and a CAS signal. Numeral 22 designates a control signal outputted from the RAS/CAS signal generation circuit 13 to control an outputting timing of row address from a multiplexer 23. The multiplexer 23, when a logical page number, a physical page number, an address in a page and the control signal 22 being inputted thereto, and being controlled by the control signal 22 to output a DRAM row address, selects a physical page number (DRAM row address) translated by a TLB 11 and multiplexes the inputted address in a logical page and physical page number to output the DRAM address from low order 12 bits of the address. But, the multiplexer 23, when not being controlled to output a row address, outputs a logical address untranslated. That is, the inputted logical page number is selected and outputted in parallel with the inputted address in the logical page.

The operation of the above-mentioned memory control device will be explained hereinafter. A logical page number among a logical address is outputted to the TLB 11 and the discrimination means 20, and an address in a logical page among the logical address is outputted to the multiplexer 23. Although the TLB 11 into which the logical page number is inputted performs the same operation as that in the embodiment 1, and at the same time, the discrimination means 20 into which the logical page number is inputted discriminate whether the logical page number is the address in the first area or that in the second area. When the discrimination result indicates that the logical page number belongs to the first area, the inhibition signal 21 is made inactive, while the discrimination result indicates that the logical page number belongs to the second area, the inhibition signal 21 is made active. The RAS/CAS signal generation circuit 13, on receiving the inhibition signal 21 which is active, generates a RAS/CAS signal on the basis of a hit/miss signal, and also outputs a control signal 22 to the multiplexer 23 to output a DRAM address. On the other hand, when the receiving inhibition signal 21 is inactive, the RAS/CAS signal generation circuit 13 does not change the logic of the RAS/CAS signal, and outputs a control signal 22 to the multiplexer 23 to select the inputted logical page number and to output the address in parallel with the address in the logical page.

Figure 13:
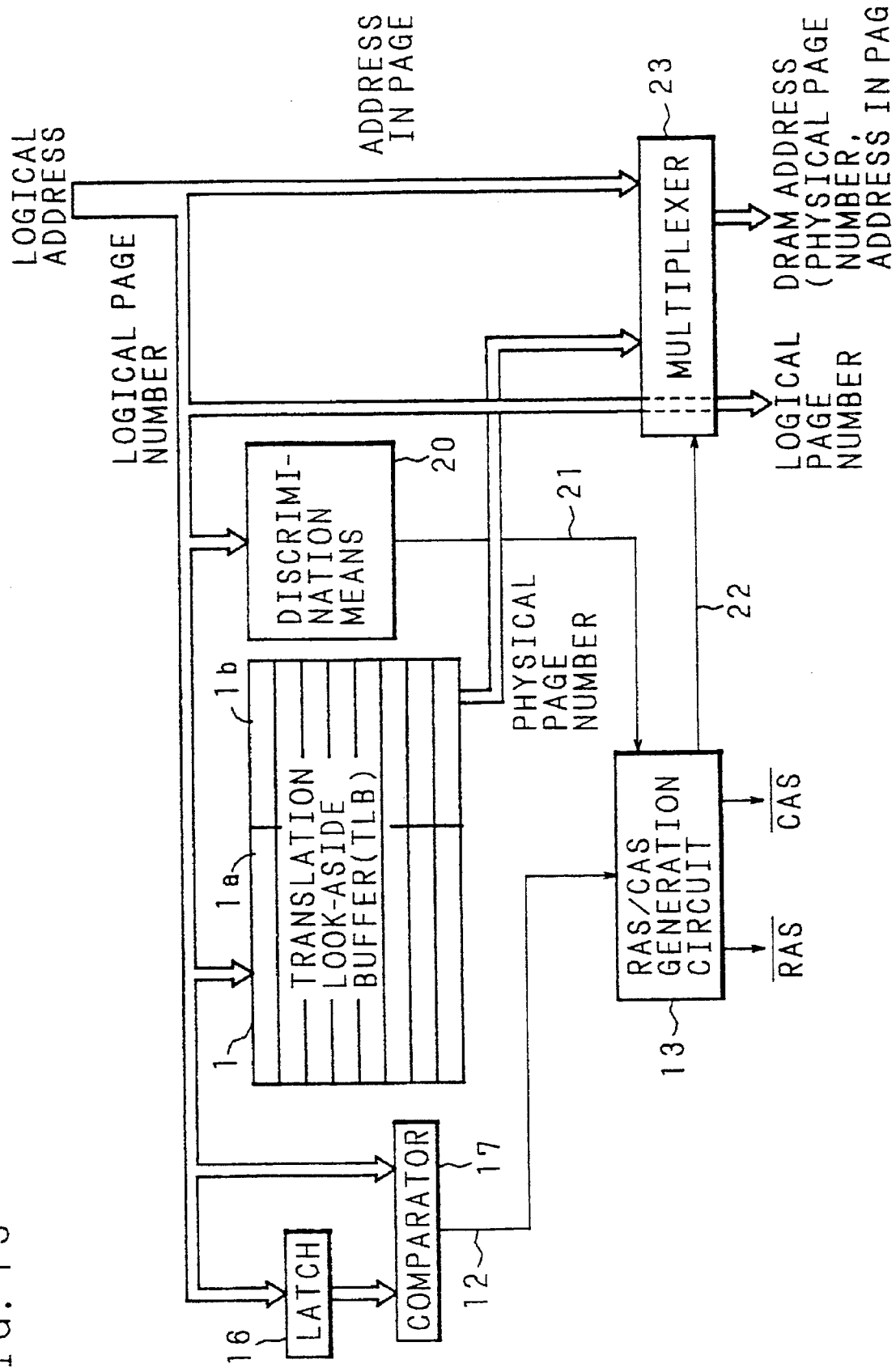
FIG. 13 is a block diagram of a modification of the sixth embodiment of a memory control device of the present invention.

In the memory control device configured as above, the access to the first area allows the access to a DRAM in the same manner as in the embodiment 1, and the access to the second area allows the access to the physical space with the logical address untranslated, thereby making it possible for the device to be connected to other elements such as a ROM, an I/O device, and the like. A high speed processing in the fast page mode may be performed by employing the latch 16 and the comparator 17 shown in FIG. 7 of the embodiment 3 (FIG. 13).

[Embodiment 7]

A memory control device will be explained which has function of providing the same logical address space to all processes, whereby a plurality of processes can access the same logical address in addition to the function as in the embodiment 6.

Figure 14:
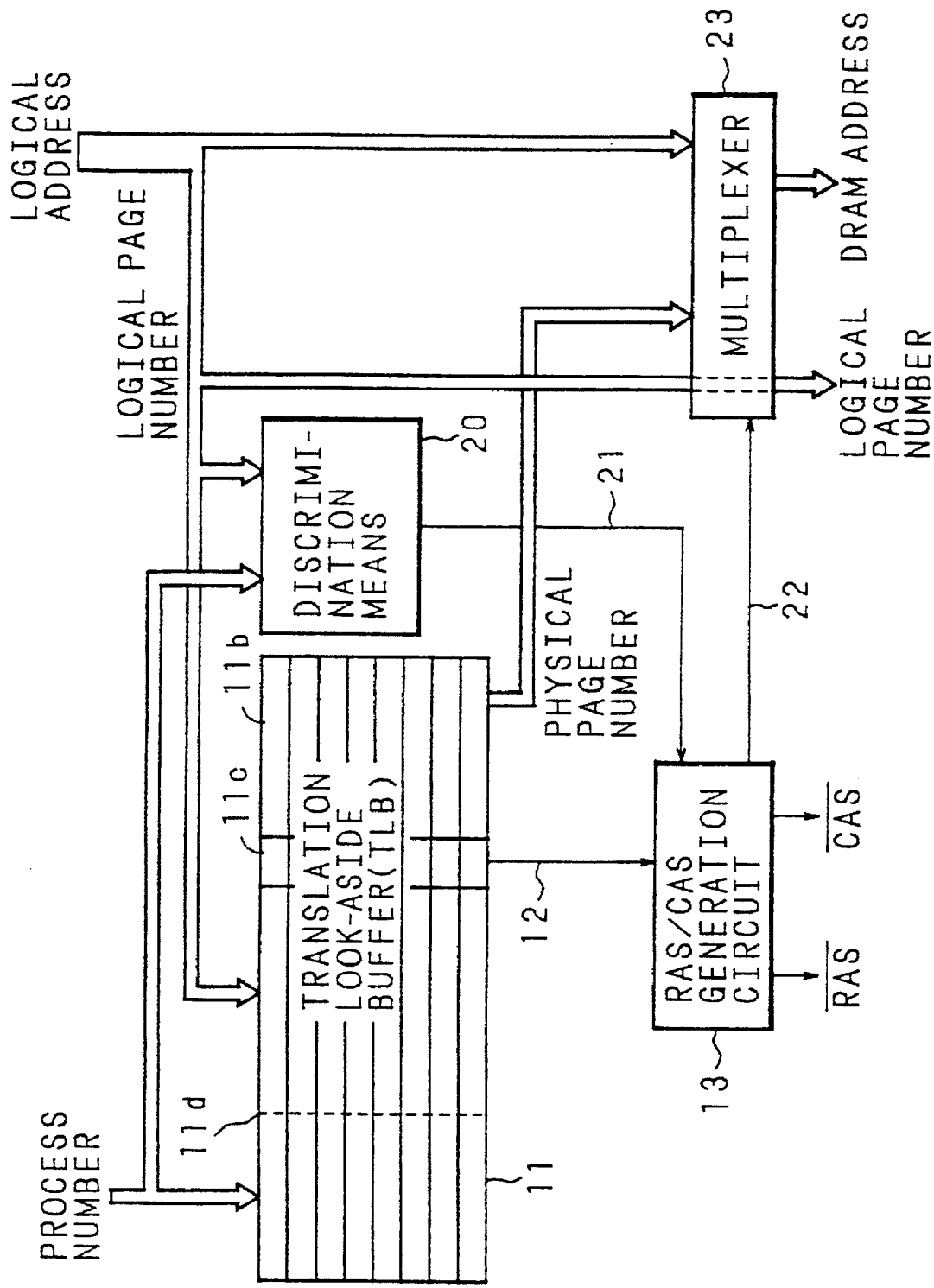
FIG. 14 is a block diagram of a seventh embodiment of a memory control device of the present invention.

FIG. 14 is a block diagram of a memory control device in a seventh embodiment of the present invention. In FIG. 14, numerals 11 through 13 and 20 through 23 designate the same as or the parts corresponding to those in FIG. 9 or FIG. 12, except that a process number is inputted also to discrimination means 20 in this embodiment. The discrimination means 20 discriminate whether an access is to the first area or to the second area shown in FIG. 11 on receiving a high order 18-bit logical page number among a logical address and a process number. The discrimination means 20 inhibit a RAS/CAS signal generation circuit 13 from changing the logic of a RAS signal and a CAS signal when the logical number belongs to the first area and besides the process number is a specific process number. The subsequent operation is the same as that in the Embodiment 6.

Figure 15:
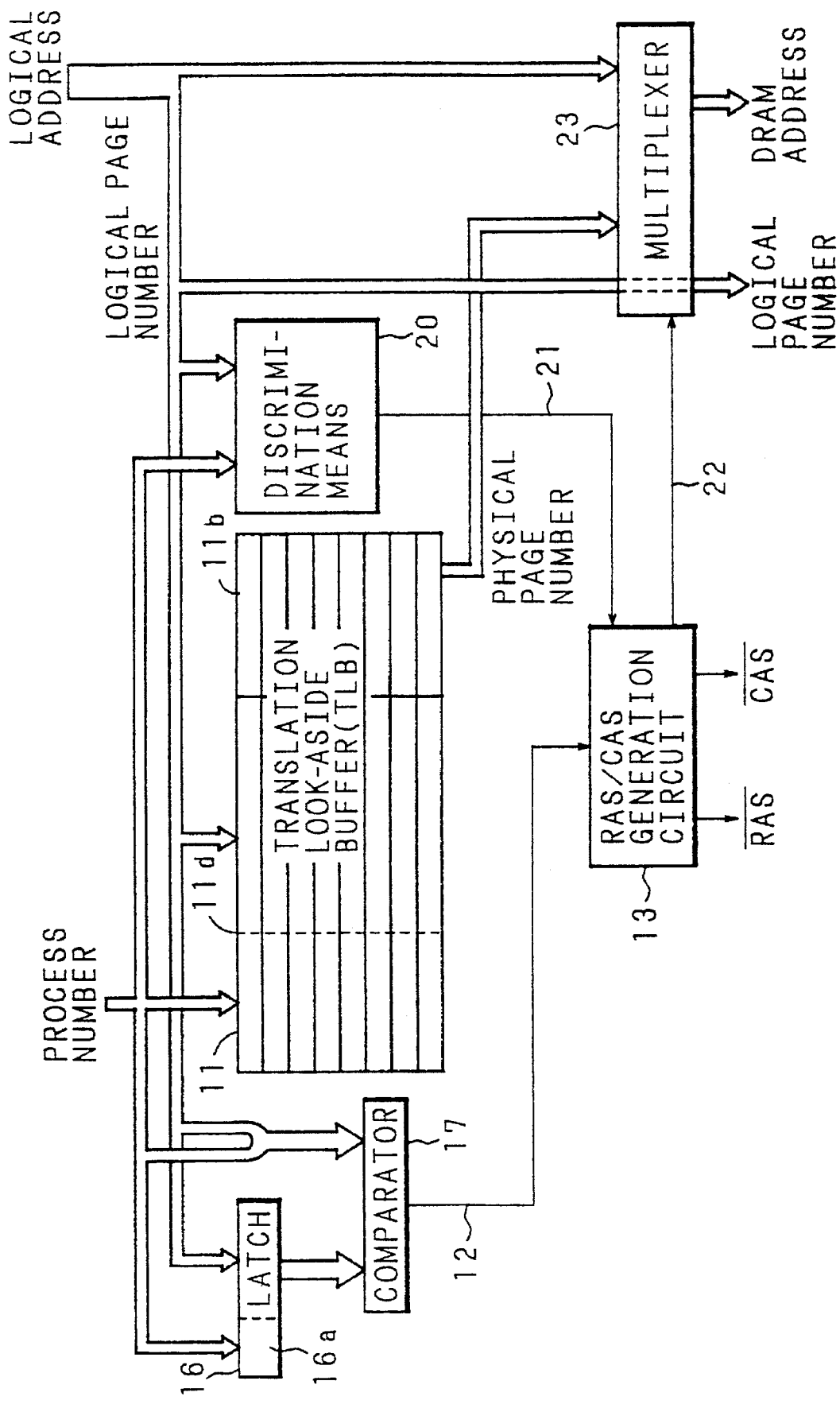
FIG. 15 is a block diagram of a modification of the seventh embodiment of a memory control device of the present invention.

Also in this embodiment, as in the embodiment 6, all processes can access to own instructions or data in a DRAM allocated on the physical address space without confusing the own instructions or data with those of other processes when accessing the first area, and further, when a process having a specific process number accessing the second area, the RAS/CAS signal generation circuit 13 does not change the RAS signal and the CAS signal, and the multiplexer 23 outputs the logical address untranslated, so that the process can access the physical process space by accessing the logical address space, thereby making it possible for the device to be connected to other elements such as a ROM, an I/O device, and the like. A high speed processing in the fast page mode may be performed by employing the latch 16 and the comparator 17 shown in FIG. 7 of the embodiments 2 and 3 (FIG. 15).

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A memory control device for deciding an access mode to a DRAM (dynamic random access memory) in a virtual memory system which has, in addition to a normal mode in which a row address and a column address of a DRAM are outputted to access the DRAM, a fast page mode as the access mode in which only the column address is outputted to the DRAM when an access is to the same row address as at the last access in order to access the DRAM at a high speed, said device comprising:

address translation means having a group of registers with the number corresponding to that of the logical pages, which are provided to store physical page numbers with corresponding logical page numbers, respectively, means for holding information that indicates whether the logical page number is translated to the physical page number at the last access, and means for outputting a signal as a result of judgment whether the same row address is to be currently accessed as at the last access according to said information held by the information holding means, the logical page number corresponding to predetermined higher order bits of a logical address input to the DRAM and the column address of the DRAM corresponding to the remaining bits of the logical address; and DRAM access control means for accessing the DRAM in the fast page mode by outputting only the address in logical page as a column address to the DRAM when said judgment result signal outputted by the address translation means indicates that the same row address of the DRAM is to be currently accessed as at the last access to the DRAM, and for accessing the DRAM in the normal mode by outputting both the physical page number translated from the logical page address as a row address and the address in page as a column address to the DRAM when said judgment result signal indicates that the different row address of the DRAM is to be currently accessed from that at the last access.

2. A memory control device as set forth in claim 1, wherein said logical page number includes a process number attached to each process in order to identify each of a plurality of processes.

3. A memory control device as set forth in claim 1, wherein said address translation means comprises both a group of registers with the number corresponding to that of the physical pages, which are provided to store physical page numbers respectively corresponding to logical page numbers, and storing means for holding information of indicating whether the logical page number is translated to the physical page number at the last access, which is provided corresponding to each of said group of registers.

4. A memory control device as set forth in claim 3, wherein said logical page number includes a process number attached to each process in order to identify each of a plurality of processes.

5. A memory control device as set forth in claim 1, wherein said logical page number includes a process number attached to each process in order to identify each of a plurality of processes.

6. A memory control device as set forth in claim 1, wherein said DRAM access control means includes both a RAS/CAS generation circuit for generating a row address strobe signal and a column address strobe signal to specify timings of reading a row address and a column address, respectively, in the normal mode, or for generating a column address strobe signal to specify a timing of reading a column address in the fast page mode, according to said judgment result signal, and a multiplexer for outputting the row address and the column address to the DRAM by time sharing.

7. A memory control device as set forth in claim 5, wherein said DRAM access control means includes both a RAS/CAS generation circuit for generating a row address strobe signal and a column address strobe signal to specify timings of reading a row address and a column address, respectively, in the normal mode, or for generating a column address strobe signal to specify a timing of reading a column address for the fast page mode according to said judgment result signal, and a multiplexer for outputting the row address and the column address to the DRAM by time sharing.

8. A memory control device for deciding an access mode to a DRAM (dynamic random access memory) in a virtual memory system which has, in addition to a normal mode in which a row address and a column address of a DRAM are outputted to access the DRAM, a fast page mode as the access mode in which only the column address is outputted to the DRAM when an access is to the same row address as at the last access in order to access the DRAM at a high speed, and said virtual memory system having a first logical address space allocated with a logical address of the DRAM to be translated to a physical address and a second logical address space allocated with an address of another access target without requiring a translation to a physical address, other than said logical address, said device comprising:

address translation means having a group of registers with the number corresponding to that of the logical pages, which are provided to store physical page numbers with corresponding logical page numbers, respectively, means for holding information that indicates whether the logical page number is translated to the physical page number at the last access, and means for outputting a signal as a result of judgment whether the same row address is to be currently accessed as at the last access according to said information held by the information holding means, the logical page number corresponding to predetermined higher order bits of a logical address input to the DRAM and the column address of the DRAM corresponding to the remaining bits of the logical address;

address discrimination means for discriminating whether an access is to the first logical address space or the second logical address space on the basis of the logical page number; and access control means for accessing the DRAM in the fast page mode only outputting the address in the logical page as a column address to the DRAM when the address discrimination means discriminate that an access is to the first logical address space, and said judgment result signal outputted by the address translation means indicates that the same row address of the DRAM is to be currently accessed as at the last access to the DRAM, or accessing the DRAM in the normal mode by outputting a physical page number translated from a logical page address as a row address and an address in a logical page as a column address to the DRAM when the address discrimination means discriminate that an access is to the first logical address space, and said judgment result signal indicates that the different row address of the DRAM is to be currently accessed from that at the last access to the DRAM, but inhibiting an access to the DRAM when the address discrimination means discriminate than an access is to the second logical address space, by means of outputting a logical page number not translated to a physical page number regardless of results of judgment by the address translation means.

9. A memory control device as set forth in claim 8, wherein said address translation means comprises both a group of registers with the number corresponding to that of physical pages, which are provided to store physical page numbers respectively corresponding to logical page numbers, and storing means for holding information of indicating whether the logical page number is translated to the physical page number at the last access, which is provided corresponding to each of said group of registers.

10. A memory control device as set forth in any of claim 8, wherein said logical page number includes a process number attached to each process in order to identify each of a plurality of processes.

11. A memory control device as set forth in claim 8, wherein said access control means includes both a RAS/CAS generation circuit for generating a row address strobe signal and a column address strobe signal to specify timings of reading a row address and a column address, respectively in the normal mode, or for generating a column address strobe signal to specify a timing of reading a column address in the fast page mode, according to said judgment result signal, and a multiplexer for outputting the row address and the column address to the DRAM by time sharing.

* * * * *

UNITED STATES PATENT AND TRADEMARK OFFICE
CERTIFICATE OF CORRECTION

PATENT NO. : 5,652,860
DATED : July 29, 1997
INVENTOR(S) : Fumiki SATO

It is certified that error appears in the above-identified patent and that said Letters Patent is hereby corrected as shown below:

Column 14, line 41, claim 10, delete "any of".

Signed and Sealed this

Tenth Day of February, 1998

Attest:

BRUCE LEHMAN

Attesting Officer        Commissioner of Patents and Trademarks